United States Patent [19]
Everhart

[11] 3,979,644
[45] Sept. 7, 1976

[54] OVERVOLTAGE PROTECTION ARRANGEMENT

[76] Inventor: Norman Everhart, 74 Highspire Road, Richboro, Pa. 18954

[22] Filed: Jan. 23, 1975

[21] Appl. No.: 543,452

[52] U.S. Cl. ................................. 317/20; 317/22; 317/33 VR; 317/33 SC; 321/21; 323/17
[51] Int. Cl.² ................................. H02H 9/04
[58] Field of Search............. 317/22, 23, 31, 33 SC, 317/33 VR, 20, DIG. 5, 16; 321/21; 323/17, 24, 25

[56] References Cited
UNITED STATES PATENTS

| | | | |
|---|---|---|---|
| 3,299,321 | 1/1967 | Damon | 317/31 X |
| 3,408,552 | 10/1968 | Weber | 317/31 X |
| 3,571,608 | 3/1971 | Hurd | 317/31 X |
| 3,742,337 | 6/1973 | Digneffe | 323/24 X |

Primary Examiner—Harry Moose

[57] ABSTRACT

An improved overvoltage protection circuit interrupts a power transmission path in an open circuit mode responsive to an overrange input power potential, and is automatically reset to its quiescent operative condition when the overvoltage condition abates. In accordance with various aspects of the present invention, AC energy is coupled by the instant arrangement at a reduced level while the fault condition persists, such that the driven load is continuously energized.

26 Claims, 6 Drawing Figures

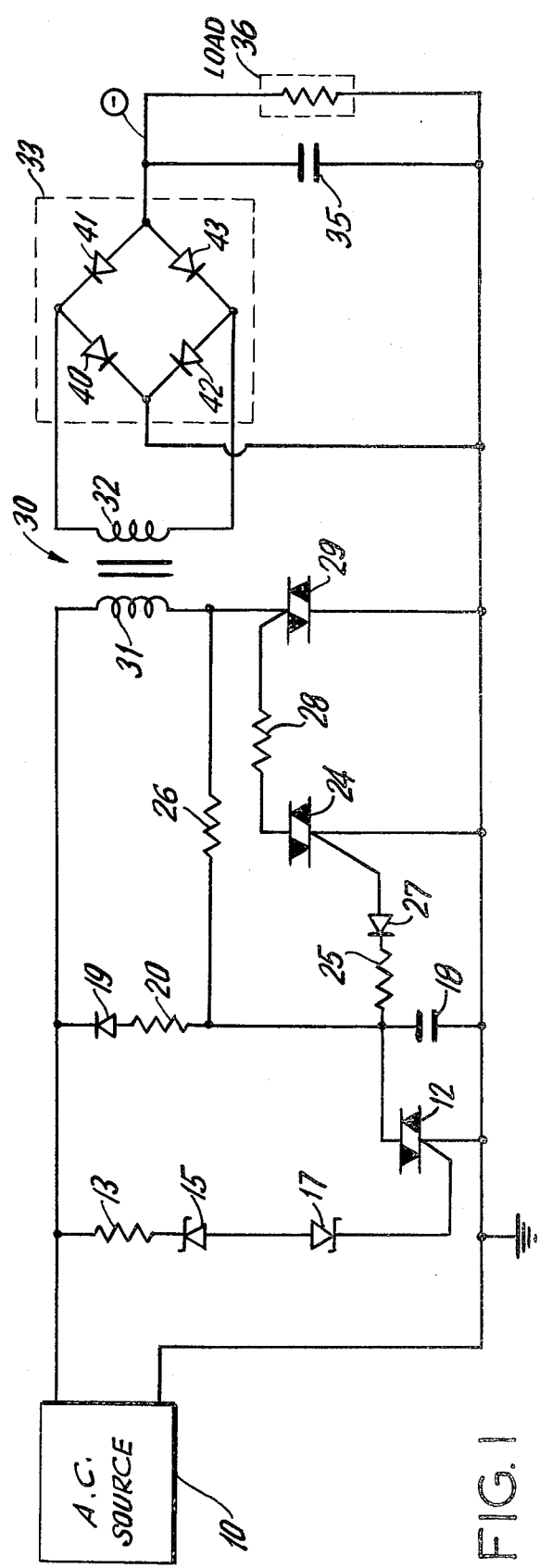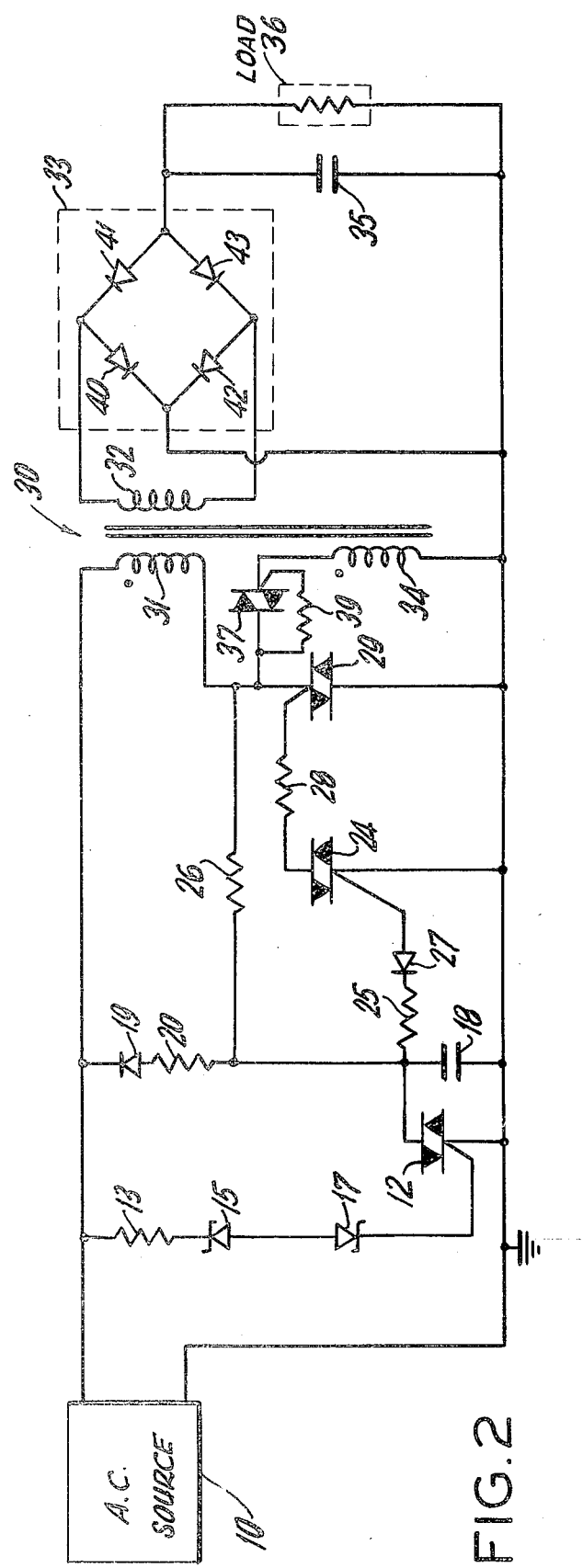
FIG. 1
FIG. 2

OVERVOLTAGE PROTECTION ARRANGEMENT

This invention relates to electronic circuits and, more specifically, to an improved electronic overvoltage protection circuit which is automatically reset when the overvoltage fault condition ends and which maintains power flow during the period of the overvoltage.

In many applications of present day interest, e.g., in the operation of R.F. distribution equipment as in a CATV system, a protective mechanism is desirable to insulate sensitive electronic active elements from potentially destructive overvoltage conditions. Thus, for example, CATV systems have historically had to accommodate overvoltage conditions caused by imbalances in a power distribution system of a community being served, electrical storms, or the like.

By reason of such line voltage surges, a so-called "crowbar" voltage protection circuit has been employed, wherein a power conducting semiconductor such as a silicon controlled rectifier, triac, power transistor or the like has been turned on via a voltage sensing device or circuit connected to the control port of the power element. When fired responsive to an overvoltage condition, the SCR, triac or the like fires to create a short-circuit across the power flow channel. This low impedance bridged across the power channel totally disables the power supply, thereby protecting — but also totally disabling — the protected equipment. In such prior art apparatus when the fault overvoltage condition abates, the power supply is reset, either manually or automatically, as when thermal breakers opened by the fired crowbar circuit reset. Such crowbar type of operation has induced large spurious voltage transients in systems; has often led to fuse and breaker failure requiring maintenance visits to often remotely located line amplifiers and the like; and, as above stated, totally disables the protected equipment for the entire duration of the overvoltage condition. In a CATV context, R.F. services are interrupted as long as the fault condition obtains, and until the crowbar shorting element is reset.

It is an object first of the present invention to provide improved overvoltage protection apparatus.

More specifically, it is an object of the present invention to provide improved overvoltage protection circuitry which is automatically reset when an overvoltage condition terminates; which does not operate in a crowbar mode, i.e., does not place a short-circuit across a power channel; and which continues to supply energy during the overvoltage condition.

The above, and other objects of the present invention are realized in specific, illustrative overvoltage protective circuitry wherein power supplying circuitry, as for CATV distribution equipment includes a transformer coupled to an AC power line. A controlled bilaterally conducting switching device such as a triac connects the primary winding of the transformer to the AC source, and the transformer secondary services any conventional DC power supply, e.g., a diode full wave bridge, filter capacitor, and/or the like. When power is first applied, a control capacitor charges to a level sufficient to turn on the triac, thereby connecting the primary transformer winding to the AC source and affording power to the serviced equipment.

A further normally nonconductive controlled switch, e.g., an additional triac, is connected across the enabling capacitor, and is gated by overvoltage sensing elements or circuitry, e.g., voltage threshold conducting Zener diodes. When an overvoltage condition is sensed, the additional triac conducts, thereby discharging the control capacitor and turning off the main conducting power triac. This operatively disconnects the transformer primary winding from one side of the AC line during the term of the fault condition, hence protecting the subject equipment during the voltage surge.

In accordance with various further aspects of the instant invention, additional circuitry becomes operative when the power triac is nonconductive during a fault condition to continue the supply of energy (but at a reduced voltage level) to the serviced equipment. Thus, the protected equipment continuously performs.

The above and other features and advantages of the present invention will become more clear from the following detailed description of specific illustrative embodiments thereof, present hereinbelow in conjunction with the accompanying drawing, in which:

FIG. 1 is a schematic diagram of basic overvoltage protection circuitry employing the principles of the present invention;

FIG. 2 is a schematic diagram of overvoltage protective circuitry of the FIG. 1 type, further including first additional circuitry for maintaining power flow during an overvoltage fault condition;

Figure 4A:
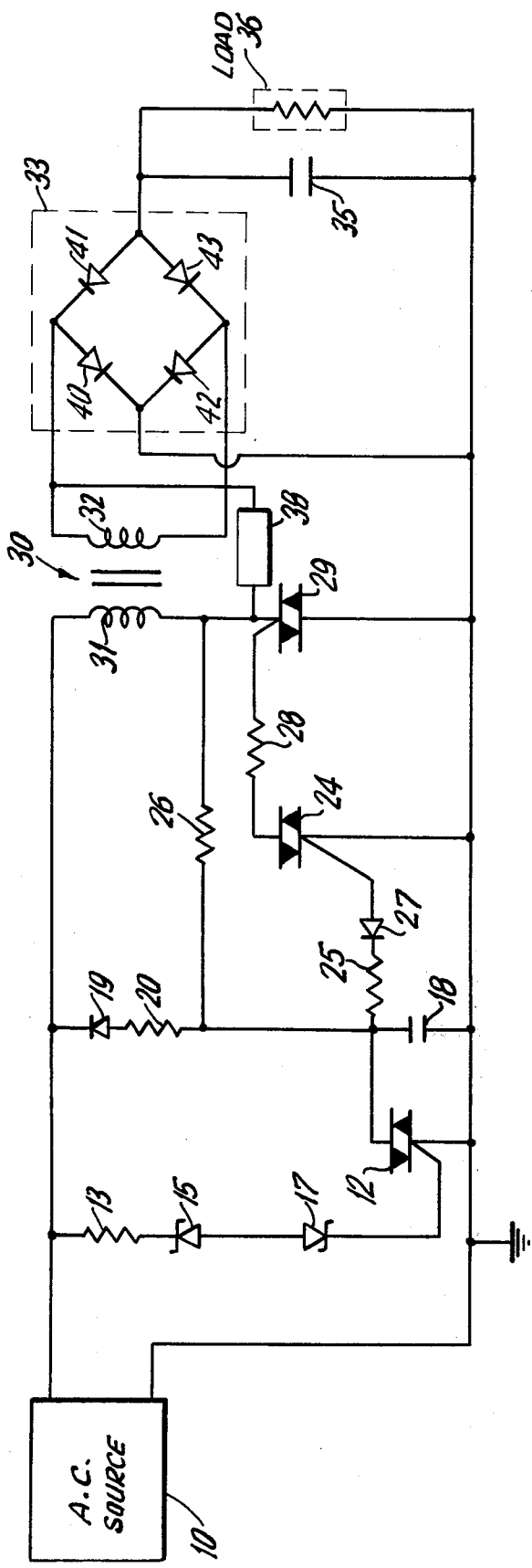
Figure 4B:
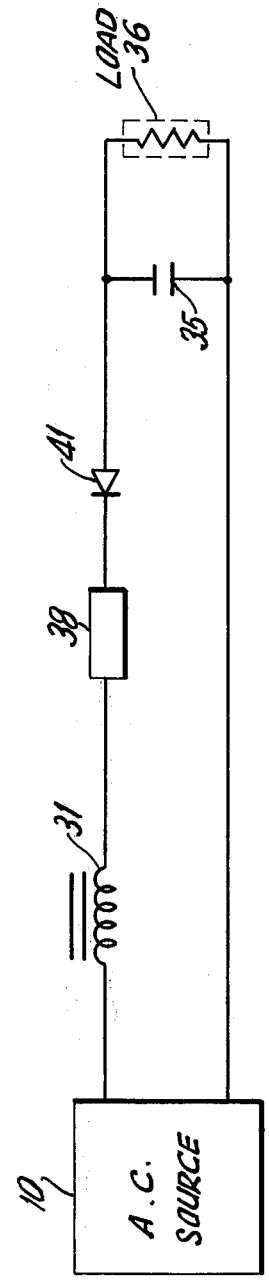

FIG. 4A schematically depicts overvoltage protection circuitry of the FIG. 1 type, further including third additional circuitry for maintaining power flow during a fault condition; and FIG. 4B is a schematic diagram operatively characterizing performance of the FIG. 4A circuitry during a fault condition.

Throughout the several figures, like elements are identified by like reference numerals.

Referring now to FIG. 1, there is shown specific illustrative overvoltage protecting circuitry employed to supply power from an AC source 10 to a load 36 (after conversion to a direct current potential), while protecting the load 36 against an overvoltage supplied by the source 10. To this end, the AC energy supplied by the source 10 is coupled to the primary winding 31 of a transformer 30. The voltage at the transformed secondary winding 32 is converted to DC for end use, as via a full wave diode bridge 33 and filter capacitor 35. A voltage regulator or the like may, of course, be disposed between the capacitor 35 and the load 36.

The main terminal-1, terminal-2 conduction path of a power triac 29 connects the bottom terminal of the transformer primary winding 31 to one side of the AC source line (assumed for convenience only to grounded), the other side of the winding being connected directly to the other AC line. The gate, control port of the power triac 29 is selectively energized as described below by a resistor 28 and a triac 24 which, in turn, has its gate energized by the voltage across a capacitor 18 acting through a resistor 25 and a diode 27. The capacitor 18 is charged during negative AC line half cycles by a resistor 20 and a diode 19.

For overvoltage protection purposes, a triac 12 is connected in parallel with a capacitor 18. The control port of the triac 12 is connected to the AC line via oppositely poled Zener diodes 15 and 17 and a current limiting resistor 13. The voltage conducting threshold levels of the Zener diodes 15 and 17 correspond to the overvoltage points to be detected at the output of the source 10.

When (as is normally the case) AC energy of an amplitude below the overvoltage fault level is applied to the circuit of FIG. 1, the capacitor 18 charges during negative line half cycles to a level sufficient to energize the gate of the triac 24 through the resistor 25 and diode 27. The negative potential at the upper end of the capacitor 18 persists for both line half cycles, continuously gating the triac 24 conductive. The conducting triac 24 in turn supplies sufficient energy to the control port of the power triac 29 to render it conductive, thereby operatively connecting the lower end of the transformer primary winding 31 to the grounded side of the AC source 10 output. Substantially the full output of the source 10 is thus supplied to the primary winding 31. The fully energized transformer and the following circuitry then generate a DC potential for exciting the load 36 in a conventional manner.

During such normal input potential conditions as above described, the maximum voltage excursion during each half cycle supplied by the AC source 10 is insufficient to fire the reversely poled (for that half cycle) one of the Zener diodes 15 or 17. Thus, the triac 12 remains nonconductive and does not affect the circuit operation above described.

However, when an overvoltage is encountered during any line half cycle, the reversely directed diode 15 or 17 does conduct and, the other cascaded diode 15 or 17 being forward biased, the gate of the triac 12 is energized. Accordingly, the capacitor 18 rapidly discharges through the terminal-1, terminal-2 conductive path of the triac 12, thereby obviating the negative potential normally present at the upper terminal of the capacitor 18 in the drawing. This turns triacs 24 and 29 off, operatively disconnecting the transformer primary winding 31 from the AC source 10. Accordingly, potential is removed from the power supply and load, hence protecting the load as long as the overvoltage condition exists. Protection is afforded by an open circuit rather than by crowbar short-circuit mode, therefore minimizing electrical transients when an overvoltage condition is encountered.

When the overvoltage condition abates, the gate of the triac 12 is no longer energized and the triac 12 ceases to conduct at about the next zero crossing of the AC wave supplied by the source 10, at which point the terminal-1, terminal-2 potential is insufficient to further sustain conduction. To this end, a resistor 26 aids in supplying the zero going, polarity reversing potential to the triac 12. Thus, following cessation of the overvoltage condition, the capacitor 18 again charges to its condition above discussed such that the flow of energy to the load resumes in a normal manner.

The basic overvoltage protection circuit illustrated in FIG. 1 and described above thus fully protects the load, but does not supply energy to the load 36 during the period of the overvoltage condition. To this end, and referring not to the circuit arrangement FIG. 2, a further transformer primary winding 34 and a triac 37 may be connected in parallel with the main power triac 29 of the basic FIG. 1 arrangement. When an overvoltage condition is encountered, the triac 29 becomes nonconductive in the manner above considered. Accordingly, the triac 37 initially has the AC source potential supplied thereacross and quickly fires via the excitement supplied by a gate resistor 39. With the triac 37 conductive, the winding 34 is operatively connected in a series aiding relationship with the winding 31 such that the effective turns ratio of the transformer changes from the effective turns ratio of $(N_{32}/N_{31})$ to $N_{32}/(N_{31} + M_{34})$, wherein N represents the number of turns in the indicated winding. Thus, the potential supplied at the output of the transformer 32 is markedly reduced during the term of the overvoltage fault.

When the fault clears, the principal power triac 29 again fires in the manner above described to shortcircuit the triac 37 and the winding 34, such that the potential output of the transformer secondary winding 32 resumes its normal level. Thus, the circuitry of FIG. 2 not only protects against overvoltage condition — it also assures a continuation of energy (but at a lower level) while the fault condition obtains.

Figure 3A:
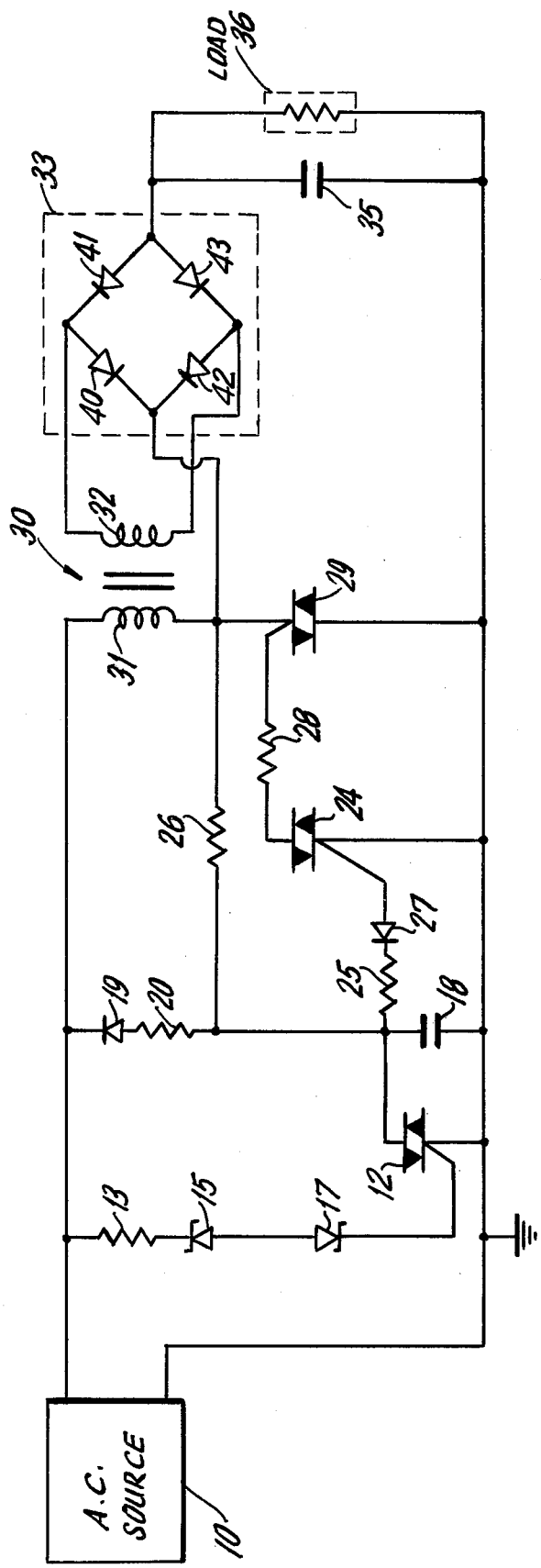
FIG. 3A is a schematic diagram depicting overvoltage protective circuitry of the FIG. 1 type, further comprising second additional circuitry for maintaining power flow during a fault condition.

A further, alternative circuit arrangement for continuing power flow during the period of overvoltage condition is shown in FIG. 3A, wherein one bridge 33 node is connected to the winding 31 — triac 29 junction, rather than to the grounded AC power line. During normal operation, the bottom terminal of the winding 31 and the full wave bridge node at the junction of the rectifier diodes 40 and 42 are grounded, and perform in the conventional manner above described. However, when an overvoltage condition is sensed, the triac 29 becomes open circuited, and the circuitry of FIG. 3A operatively assumes the configuration shown in FIG. 3B. The primary winding 31 of transformer 30 in essence functions as a series inductance, and the power supply capacitor 35 is charged by half wave rectification performed by the bridge diodes, which are effectively connected as two cascaded diodes in each of two parallel paths. Load 36 thus continues to be energized with a DC potential which is reduced from its former normal level (absent regulation) and which assumes a value something below that instantly supplied by the AC source 10 during the fault condition. Again, when the fault condition clears, the triac 29 again conducts, and the composite circuit performs in its conventional mode.

It is observed that the direct connection between the bridge 33 and transformer 31 — triac 29 node should normally be employed only when the transformer 30 operates in a step-up mode, i.e., where the winding 32 includes a greater number of turns than the winding 31 such that the output potential supplied by winding 32 exceeds that which drives winding 31. If the arrangement of FIG. 3A is attempted where an isolation of step-down transformer mode is employed, the overvoltage supplied by the source 10 during a fault condition might itself be sufficient when reflected across the capacitor 35, to harm the load 36.

A still further embodiment of the instant invention for protecting a load during overvoltage conditions, and for continuously supplying power to a load during such a condition, is shown in FIG. 4A. The arrangement is substantially the same as shown in FIG. 3A, except that a device or network 38 is connected between the rectifier bridge 33 node connected to the upper end of the transformer secondary winding 32, and the junction between the primary winding 31 and the triac 29. Again, the circuit operates in the manner above described when no overvoltage is present. The network 38 (discussed below both structurally and functionally) simply at most comprises an additional load on the transformer secondary during normal circuit functioning.

When an overvoltage condition is present, the triac 29 becomes open circuited as above discussed, and the circuit of FIG. 4A effectively assumes the configuration shown in FIG. 4B. As was the case for the circuitry of FIGS. 3A – 3B, the transformer primary winding 31 becomes an effective series inductor, and the capacitor 35 and one bridge diode 41 act as a half wave DC rectifier and filter to supply energy to the load 36 while the overvoltage condition is present. The element 38 is serially employed to reduce the potential developed across the capacitor 35 during the overvoltage condition (assuming an isolation or step-down transformer). The element 38 may comprise a Zener diode to simply drop potential; a capacitor for acting as a voltage divider with the capacitor 35; a voltage dropping resistor; a diode poled in the same direction as the bridge diodes (for a step-up transformer where only coupling and not series voltage reduction is required); or the like. Thus, by utilizing the voltage dropping and/or coupling element or network 38, the load 36 may be continuously energized during the fault condition.

As discussed repeatedly above, when the fault cures, the triac 29 again conducts and the circuit of FIG. 4A resumes normal operation.

The above described arrangements have thus been shown to protect a load against overvoltage conditions; and to also provide a continuous flow of energy during an overvoltage.

Figure 3B:
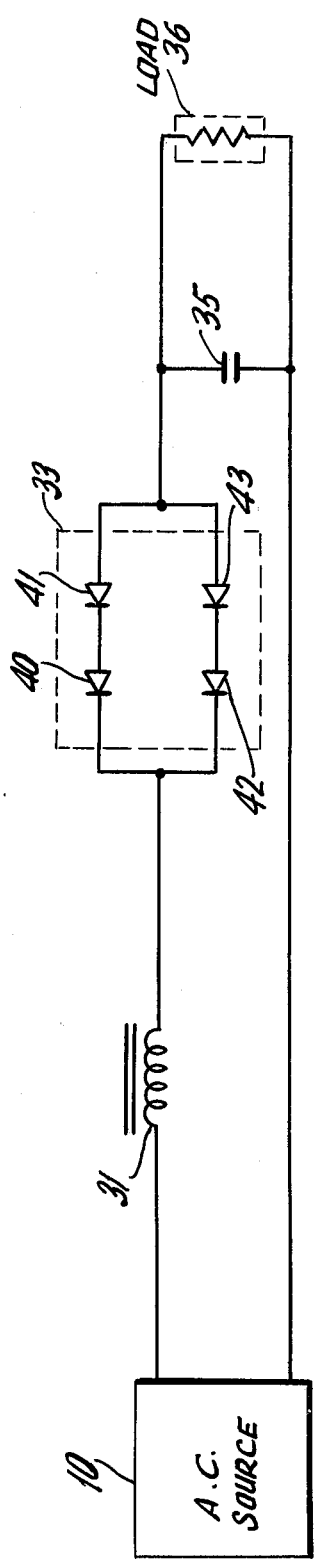
FIG. 3B is a schematic diagram operatively characterizing performance of the FIG. 3A circuitry during a fault condition.

It is observed for completeness that the capacitor 18 charging diode 19 is poled to respond to the same AC source 10 phase (in this case negative) as the polarity of the potential developed across the capacitor 35 (negative) (i.e., to be active when bridge 33 conducts). With reference to FIG. 3B and/or 4B, it will be seen that the AC line is relatively heavily loaded during negative line half cycles by the capacitor 35 and the load 36. The corresponding relatively large current flow in the AC lines during such periods has the effect of reducing line voltage at such times. This, in turn, reduces the voltage applied across the charging resistor 20, which is maximum during such periods since no part of the overvoltage supplied by the source 10 is taken up by the capacitor 18 which is substantially totally discharged during the overvoltage. Thus, the AC line losses during the negative half cycle reduce the power dissipation requirement for the resistor 20.

The above described arrangements are merely illustrative of the principles of the present invention. Numerous modifications and adaptations thereof will be readily apparent to those skilled in the art without departing from the spirit and scope of the present invention.

What is claimed is:

1. In combination in overvoltage protective circuitry, first and second circuit points adapted for receiving an AC potential, a transformer having primary and secondary windings, a first terminal of said transformer primary winding connected to said first AC receiving circuit point, a bidirectionally conducting controlled switch for connecting a second terminal of said transformer primary winding to said second AC voltage receiving circuit point, a first capacitor and unidirectional conducting means serially connected between said AC receiving circuit points, means connecting said first capacitor to said bidirectionally conducting controlled switch for controlling said switch, overvoltage responsive controlled switching means connected in parallel with said capacitor, and voltage responsive threshold triggering means connected to the gate terminal of said overvoltage responsive switching means and one of said AC potential receiving circuit points.

2. A combination as in claim 1 further comprising power buffering controlled switch means connected between the gate terminal of said bidirectionally conducting controlled switch and said capacitor.

3. A combination as in claim 2 wherein said bidirectionally conducting controlled switch, and said overvoltage and buffer controlled switch means each comprises a triac.

4. A combination as in claim 3 further comprising a resistor connected between said second terminal of said transformer primary winding and said capacitor.

5. A combination as in claim 1 wherein said voltage responsive threshold triggering means comprises first and second opposite poled Zener diodes.

6. A combination as in claim 1 wherein said unidirectional conducting means comprises a diode and a resistor cascaded therewith.

7. A combination as in claim 1 further comprising an additional transformer primary winding connecting parallel with said bidirectionally conducting controlled switch.

8. A combination as in claim 7 wherein said bidirectionally conducting controlled switch comprises a triac, and further comprising an additional triac serially connected with said additional transformer primary winding.

9. A combination as in claim 1 further comprising means connecting said second terminal of said transformer primary winding with one terminal of said transformer secondary winding.

10. A combination as in claim 9 wherein said transformer primary-secondary winding connecting means comprises voltage dropping means.

11. A combination as in claim 9 wherein said transformer primary-secondary winding connecting means comprises a diode.

12. A combination as in claim 1 further comprising rectifier means connected to said transformer secondary winding, and means connecting said second terminal of said transformer primary winding with said rectifier means.

13. A combination as in claim 12 wherein said primary winding - rectifier connecting means includes voltage dropping means.

14. A combination as in claim 12 further comprising a source of AC energy connected to said first and second circuit points, and rectifier means, a filter capacitor and load means connected to said transformer secondary winding.

15. A combination as in claim 14 wherein said unidirectional conducting means includes a cascaded diode and resistor, said diode being poled to respond to the AC voltage phase corresponding to the voltage developed across said filter capacitor by said rectifier means.

16. In combination, a transformer including primary and secondary windings, controlled bidirectional switch means connected to one terminal of said transformer primary winding, rectifier means connected to said transformer secondary winding, first and second circuit terminals adapted for connection to a source of AC energy, means for quiescently biasing said controlled bidirectional switch means to a conductive state, means responsive to the potential obtaining between said first and second AC energy receiving terminals exceeding a predetermined upper bound for disabling conduction in said bidirectional controlled switch means, and means connected to the junction between said transformer primary winding and said controlled bidirectional switch means for supplying potential to said rectifier means when an overvoltage condition is present between said first and second terminals.

17. A combination as in claim 16 wherein said transformer primary - rectifier coupling means comprises an additional transformer primary winding connected in parallel with said controlled bidirectional switch means.

18. A combination as in claim 17 wherein said bidirectional switch means comprises a triac.

19. A combination as in claim 18 further comprising means for supplying an AC potential to said first and second terminals adapted therefor.

20. A combination as in claim 19 wherein said triac quiescent energizing means comprises a capacitor and a capacitor charging network serially connected between said first and second AC receiving terminals, and means connecting said capacitor and the gate of said triac.

21. A combination as in claim 20 further comprising a first additional triac connected in parallel with said capacitor, and threshold voltage conducting means connecting between the gate of said additional triac and said AC source.

22. A combination as in claim 21 further comprising a resistor connected between the junction of said transformer primary winding and said triac, and said capacitor.

23. A combination as in claim 22 further comprising a further capacitor connected to said rectifier, and a load connected across said capacitor.

24. A combination as in claim 16 wherein said primary winding - controlled switch and rectifier means connecting means comprises voltage dropping means.

25. In combination in an electronic power supply, first and second terminals for receiving electrical energy, a transformer including primary and secondary windings, rectifier means and filter means connected to said transformer secondary winding, controlled bilaterally conducting switch means serially connected with said transformer primary winding for connecting said winding across said energy receiving first and second terminals, means connected to said first and second terminals for rendering said controlled switch means conductive when AC energy within proper bounds is present thereat, and power maintaining means connecting the junction of said transformer primary winding and said controlled switch means with said rectifier means.

26. A combination as in claim 25, wherein said power maintaining means comprises unidirectional conducting means.

* * * * *

UNITED STATES PATENT OFFICE
CERTIFICATE OF CORRECTION

Patent No. 3,979,644   Dated September 7, 1976

Inventor(s) Norman Everhart

It is certified that error appears in the above-identified patent and that said Letters Patent are hereby corrected as shown below:

Assignee should read -- Jerrold Electronics Corp.

Horsham, Pennsylvania --.

Signed and Sealed this

Thirtieth Day of November 1976

[SEAL]

Attest:

RUTH C. MASON
Attesting Officer

C. MARSHALL DANN
Commissioner of Patents and Trademarks